US006978445B2

(12) United States Patent
Laane

(10) Patent No.: US 6,978,445 B2
(45) Date of Patent: Dec. 20, 2005

(54) METHOD AND SYSTEM FOR SUPPORTING USER NAVIGATION IN A BROWSER ENVIRONMENT

(75) Inventor: Lisa Ann Laane, Cupertino, CA (US)

(73) Assignee: Siebel Systems, Inc., San Mateo, CA (US)

(*) Notice: Subject to any disclaimer, the term of this patent is extended or adjusted under 35 U.S.C. 154(b) by 767 days.

(21) Appl. No.: 09/967,894

(22) Filed: Sep. 28, 2001

(65) Prior Publication Data

US 2003/0066031 A1     Apr. 3, 2003

(51) Int. Cl.[7] .............................................. G06F 9/44
(52) U.S. Cl. .................. 717/131; 717/125; 717/127
(58) Field of Search ...................... 717/131, 124–128, 717/141

(56) References Cited

U.S. PATENT DOCUMENTS

| 5,870,559 | A | * | 2/1999 | Leshem et al. ............. 709/224 |
| 5,940,593 | A | * | 8/1999 | House et al. ............... 709/203 |
| 6,061,517 | A | * | 5/2000 | House et al. ............... 717/115 |
| 6,061,699 | A | * | 5/2000 | DiCecco et al. ............ 715/513 |
| 6,112,242 | A | * | 8/2000 | Jois et al. .................... 709/225 |
| 6,195,097 | B1 | * | 2/2001 | Shrader et al. ............. 345/804 |
| 6,202,200 | B1 | * | 3/2001 | House et al. ............... 717/100 |
| 6,237,006 | B1 | * | 5/2001 | Weinberg et al. ........ 707/103 R |
| 6,253,368 | B1 | * | 6/2001 | Nelin et al. ................. 717/124 |
| 6,353,923 | B1 | * | 3/2002 | Bogle et al. ................ 717/128 |
| 6,405,238 | B1 | * | 6/2002 | Votipka ....................... 709/203 |
| 6,668,369 | B1 | * | 12/2003 | Krebs et al. ................ 717/125 |
| 6,701,514 | B1 | * | 3/2004 | Haswell et al. ............. 717/115 |
| 2002/0042799 | A1 | * | 4/2002 | Slotznick .................. 707/501.1 |
| 2002/0156815 | A1 | * | 10/2002 | Davia .......................... 707/517 |

OTHER PUBLICATIONS

Datta et al, "An architecture to support scalable online personlization on the web", ACM The VLDB Jour 10, pp 104-117, 2001.*
McKinley et al, "Pavalion: A middleware framework for collaborative web based applications", ACM GROUP, pp 179-188, 1999.*
Elbaum et al, "Improving web application testing with user session data", IEEE, pp 49-59, 2003.*
Rees, "Evolving the browser towards a standard user interface architecture", ACM AUIC, pp 1-7, 2001.*

* cited by examiner

Primary Examiner—Anil Khatri
(74) Attorney, Agent, or Firm—James W. Soong; Perkins Coie LLP

(57) ABSTRACT

Techniques to support user interaction in a browser environment, "capture" certain user actions, and perform appropriate defined actions. In a first scheme, "setup" pages are used to detect user actions. Each setup page is associated with a respective script that is executed when the page is activated (e.g., via a Back or Forward button). The script performs the defined actions to obtain the proper behavior for dependent pages. The scripts for the setup pages keep track of the state of these pages, and further maintain a local history stack for the URLs of the dependent pages. In a second scheme, each dependent page includes a hidden history frame having a script that performs a set of defined actions for the page. The script further keeps track of whether or not the dependent page has been loaded previously.

20 Claims, 9 Drawing Sheets

METHOD AND SYSTEM FOR SUPPORTING USER NAVIGATION IN A BROWSER ENVIRONMENT

BACKGROUND OF THE INVENTION

The present invention relates generally to computer processing, and more particularly to techniques for supporting user navigation in a browser environment.

The World Wide Web, commonly known as the Internet, has made it possible for users to access information stored all over the world from their individual computers. The information on the Web is typically stored as webpages (or simply, pages), each of which is associated with a unique address referred to as a Universal Resource Locator (URL). The content of each page is typically represented using a particular editing language such as the commonly used HyperText Mark-up Language (HTML).

A browser is a software program used to facilitate the retrieval and rendering of information from the Web. The browser receives (e.g., from a user) a URL for a particular page, sends the URL to the appropriate web server, downloads the page sent by the web server, and renders the downloaded page. Commonly available browsers include Navigator™ from AOL-Time Warner, Inc. and Internet Explorer™ from Microsoft Corporation, both of which are commercially available.

To enhance user experience and reduce unnecessary data accesses to the web servers, a downloaded page is typically stored in a local memory (e.g., a cache) in the client computer and the page's URL is stored to a history stack maintained by the browser. The browser typically maintains a particular number of the most recently retrieved pages in the local memory for quick retrieval, if requested again by the user. Since a user typically navigates from page to page in search for the desired information, the history stack and the stored pages allow the user to quickly navigate backward and forward through pages that have been previously retrieved and stored. If a particular desired page is already stored in the local memory, then the stored page can be quickly retrieved and displayed by the browser. Otherwise, the desired page would need to be retrieved again from the web server and displayed.

Each page may include one or more "frames", each of which may include any combination of user interface (UI) elements, descriptors, and data. The data in a particular frame may be dependent on the data and/or other content in one or more other frames on the same page. As an example, for a configuration-type application, the data in a first frame of a page may be used by a second frame to determine whether or not a particular configuration formed with the data in the first frame is valid. In this case, the specific order in which the frames are loaded is important, and the first frame should be loaded before the second frame to ensure that the proper configuration result is provided. If the second frame is somehow loaded before the first frame, then the configuration result may be incorrect.

Typically, the frames of a page may be loaded "programmatically" in a particular desired order the first time the page is loaded. The loading order of the frames is typically not controllable for each subsequent reload of the page, since a conventional browser typically loads the frames in an unspecified order. The inability to control the loading order of the frames in the page is generally acceptable for an "independent" page where each frame is not dependent on any other frames and their particular loading order is not important. However, for a "dependent" page, loading order of the page's frames may be important to obtain the proper result. The dependent pages previously loaded at a client computer may thus not be properly loaded by the browser, for example, in response to the user navigating forward and backward between these pages.

Thus, techniques that can be used to support user interaction in a browser environment and to provide the proper results for dependent pages are highly desirable.

SUMMARY OF THE INVENTION

The invention provides techniques to support user interaction in a browser environment. These techniques may be used to effectively "capture" certain user actions, and to perform the appropriate defined actions for each supported user action. The inventive techniques may be used to capture certain user actions that are not normally reported by a browser, such as Back and Forward button clicks, which may be captured indirectly using the techniques described herein. Once a user action is captured, any set of defined actions may be performed for the user action.

Various schemes may be used to keep track of dependent pages loaded at the client computer, detect user actions, and perform the appropriate sets of defined actions for the detected user actions to achieve the proper behavior on the dependent pages.

In a first scheme, a set of "setup" pages is used to detect user actions. The setup pages are associated with scripts that are executed when these pages are activated (e.g., in response to user clicks on the Back and Forward buttons). The scripts then perform the defined actions to obtain the proper behavior for the dependent pages. The setup pages may be loaded for the first dependent page retrieved for a page set (i.e., a "top" page). For this scheme, the scripts keep track of the state of the setup pages, and further maintain a local history stack for the URLs of the dependent pages.

In a second scheme, each dependent page includes a hidden history frame having a script that performs a set of defined actions for the page. The script further keeps track of whether or not the dependent page has been loaded previously. The set of actions for each dependent page is stored in the browser history stack. Details of the above schemes are described below.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

DESCRIPTION OF THE SPECIFIC EMBODIMENTS

Figure 1:
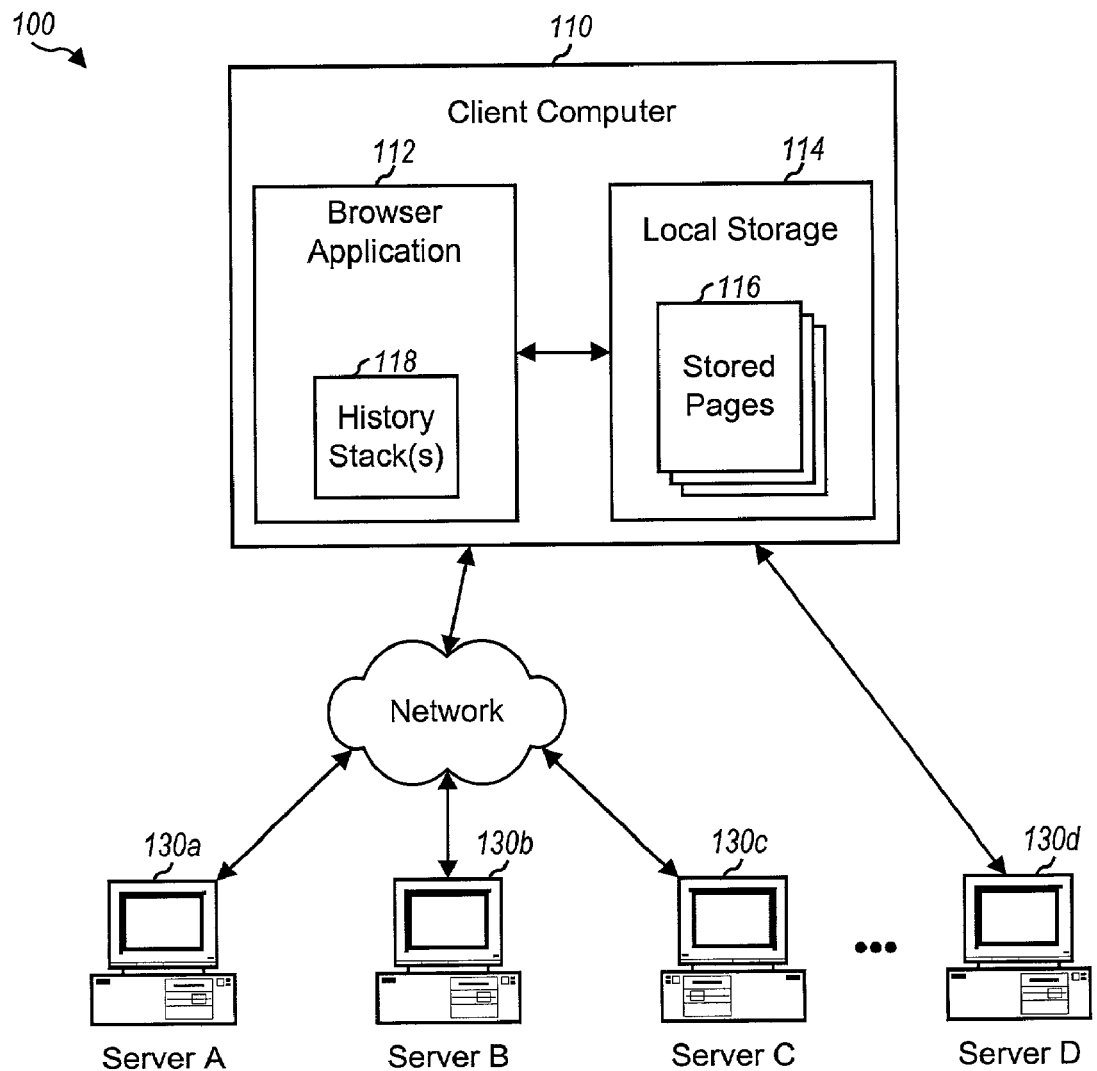
FIG. 1 is a diagram illustrating a system capable of implementing various aspects and embodiments of the invention.

FIG. 1 is a diagram illustrating a system 100 capable of implementing various aspects and embodiments of the invention. System 100 includes a client computer 110 coupled to a number of servers 130 via direct connections, a computer network (e.g., the Internet), and/or some other means. Each server 130 may be a site server operated to provide one or more webpages (or simply, pages) whenever requested by client computer 110.

Client computer 110 includes a browser application 112 (or simply, a browser) such as, for example, Internet Explorer™ or Navigator™, that may be executed to perform various functions in support of the various aspects and embodiments of the invention, as described below. Client computer 110 typically includes other software applications used to provide other functionality, but these applications are not shown in FIG. 1 for simplicity. Client computer 110 further includes a local storage 114 that may be used to store pages 116 (e.g., retrieved from servers 130 and/or locally generated by client computer 110) and other pertinent data and codes. The scripts contained within browser 112 may implement one or more history stacks 118 for the loaded pages, as described below.

Figure 2:
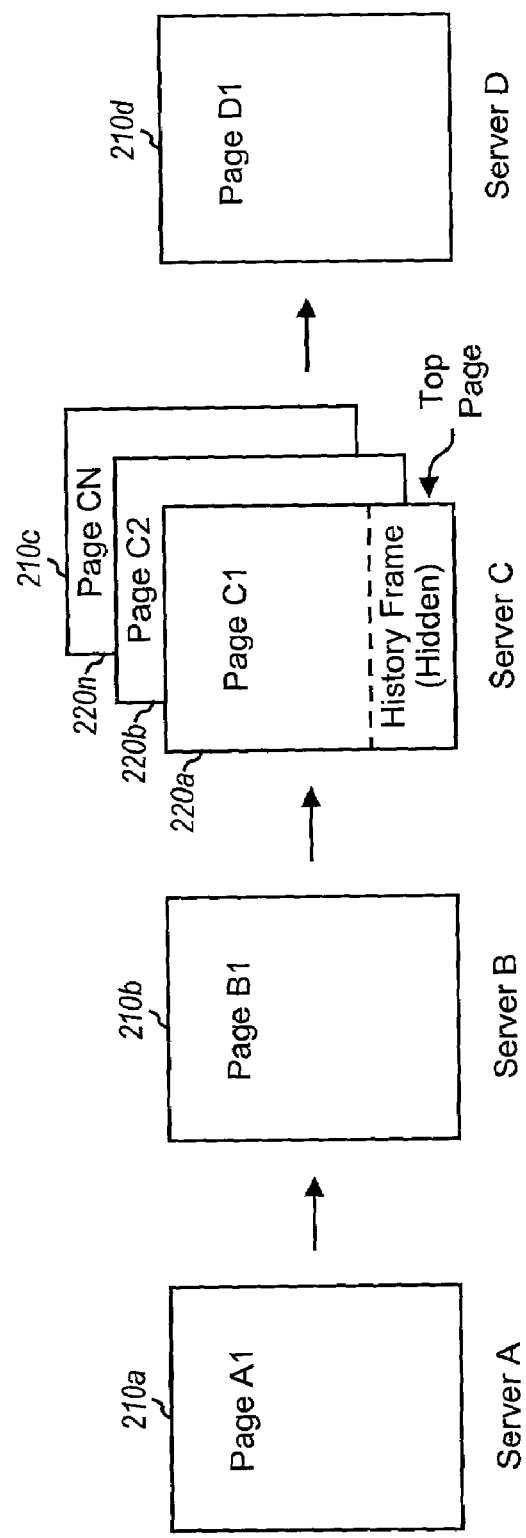
FIG. 2 graphically illustrates a number of sets of pages that may be retrieved by client computer from one or more servers.

FIG. 2 graphically illustrates a number of sets of pages that may be retrieved by client computer 110 from one or more servers 130. In this specific example, a user first accesses site "A" hosted by server 130a and retrieves a first set of one page 210a, then accesses site "B" hosted by server 130b and retrieves a second set of one page 210b, then accesses site "C" hosted by server 130c and retrieves a third set of N pages 210c, and lastly accesses site "D" hosted by server 130d and retrieves a fourth set of one page 210d. Servers 130a through 130d may be the same server.

Each page 210 may be retrieved from the appropriate server 130 and downloaded onto client computer 110. To retrieve a particular page, browser 112 executing on the client computer may be used to send a request along with the URL for the page to the appropriate server, and the server responds by sending the requested page to the client computer. The page is typically sent in a file using a particular language, such as the commonly used HyperText Mark-up Language (HTML). The browser then interprets the downloaded page and renders the page.

A useful feature supported by many browsers is the ability to navigate forward and backward from page to page. To enhance user experience and reduce unnecessary accesses to the servers, a downloaded page is typically stored in local memory 114 (e.g., a cache or a disk) on the client computer, and the loaded page's URL is further placed in a history stack maintained by the browser. The history stack and the stored pages allow the user to quickly navigate backward and/or forward through pages that have been loaded previously. If a particular desired page is already stored in the local memory, then the stored page can be quickly retrieved and displayed by the browser. Without this temporary storage, the desired page would need to be retrieved from the server each time it is accessed.

Each page typically includes one or more frames, each of which may include various types of information. For an independent page, the frames for the page may be loaded in any order to produce the desired result for the page. A conventional browser typically loads the frames of a page in an unspecified order, and this is acceptable for independent pages.

For certain applications, the specific order in which the frames of a (dependent) page are loaded may be important to produce the proper result. This may be required, for example, if there are interdependency between the frames of the page. As an example, for a "configuration-type" application, the data in a first frame of a particular page may be accessed and used by a user interface (UI) element in a different frame of the same page to determine whether or not a particular configuration formed with the data in the first frame is valid. In this case, the first frame should be loaded before the second frame to provide the proper configuration result.

For the example shown in FIG. 2, page set 210c may represent N dependent pages for the configuration-type application. As the user navigates backward and forward between these pages (e.g., by clicking on the Back and Forward buttons of the browser), an appropriate page stored in the local memory may be retrieved and loaded. However, the specific order in which the frames of the retrieved page are loaded may be important to obtain the desired result (i.e., the proper behavior).

Aspects of the invention provide techniques to support user interaction in a browser environment. These techniques may be used to effectively "capture" certain user actions (such as user clicks on the Back and Forward buttons of the browser), and to perform the appropriate defined actions for each supported user action to provide the desired result. The inventive techniques may be used to capture certain user actions that are not normally reported by a browser, such as the Back and Forward button clicks, which may be captured indirectly using the techniques described herein. Once a user action is captured, any set of defined actions may be performed for the user action.

For clarity, various aspects and embodiments of the invention are described for the example shown in FIG. 2. For this example, the pages in page sets 210a, 210b, and 210d may be independent pages, and page set 210c includes N dependent pages that need to be loaded in some particular order or manner to obtain the proper behavior. As used herein, a dependent page may include one or more interdependent frames, and may be any page that may be loaded using the techniques described herein.

Various schemes may be used to keep track of dependent pages stored at the client computer, detect user actions, and perform the appropriate sets of defined actions for the detected user actions to achieve the proper behavior on the dependent pages. Several schemes are described in detail below, and other schemes may also be implemented and are within the scope of the invention.

In a first scheme, a set of "setup" pages is used to detect user actions. The setup pages contain scripts that are executed when these pages are activated (e.g., in response to user clicks on the Back and Forward buttons). The scripts then perform the defined actions to obtain the proper behavior for the dependent pages. The setup pages may be loaded for the first dependent page retrieved for a page set (which is referred to as a "top" page). For this scheme, the scripts keep track of the state of the setup pages, and further maintain a local history stack for the URLs of the dependent pages.

In a second scheme, each dependent page includes a hidden history frame that includes pages that have scripts that perform a set of defined actions for the dependent page. The set of actions required for each dependent page is stored in the browser history stack. When the browser back or forward button is clicked, a page in the hidden history frame associated with the dependent page is loaded, and the script on that page is executed to perform the desired set of actions.

For both schemes, the client computer maintains the state as well as the data for the dependent pages. The state information and the data are thereafter used to properly load the dependent pages to obtain the proper behavior.

First Scheme

Figure 3:
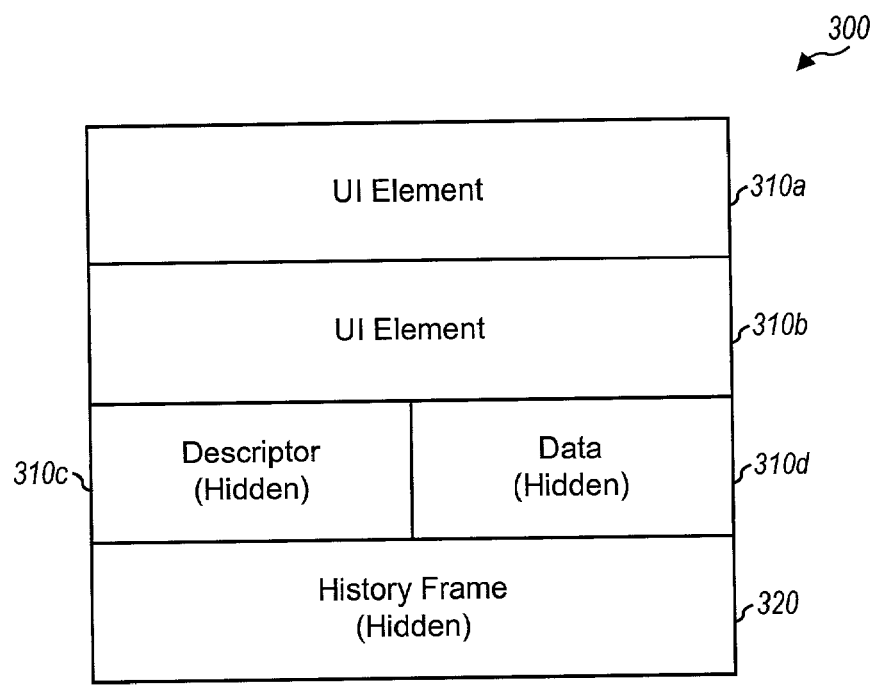
FIG. 3 is a graphical representation of a page capable of implementing various aspects and embodiments of the invention.

FIG. 3 is a graphical representation of a page 300 capable of implementing various aspects and embodiments of the invention. Page 300 may be used for the top page 220a in page set 210c shown in FIG. 2. Page 300 includes a number of frames 310, each of which may include one or more user interface (UI) elements, descriptors, files, data, or a combination thereof. The descriptor, files, and data are normally hidden. Frames 310 form the main portion of page 300, and correspond to frames that would normally be included in a conventional page. However, there may be data interdependency among frames 310, which may then require these frames to be loaded in some particular order when page 300 is loaded by the browser.

In an aspect, page 300 further includes a hidden history frame 320 that includes one or more scripts, data, and so on, that may be needed to properly load frames 310 when the page is loaded, as described below. The script may be implemented using various programming constructs such as, for example, Javascript, Visual Basic, and so on. Various details for page 300 are described below.

Page 300 may also be implemented with a hierarchical object model. In this case, page 300 may be implemented as a parent object and each frame 310 may be implemented as a child object that references the parent object.

Figure 4:
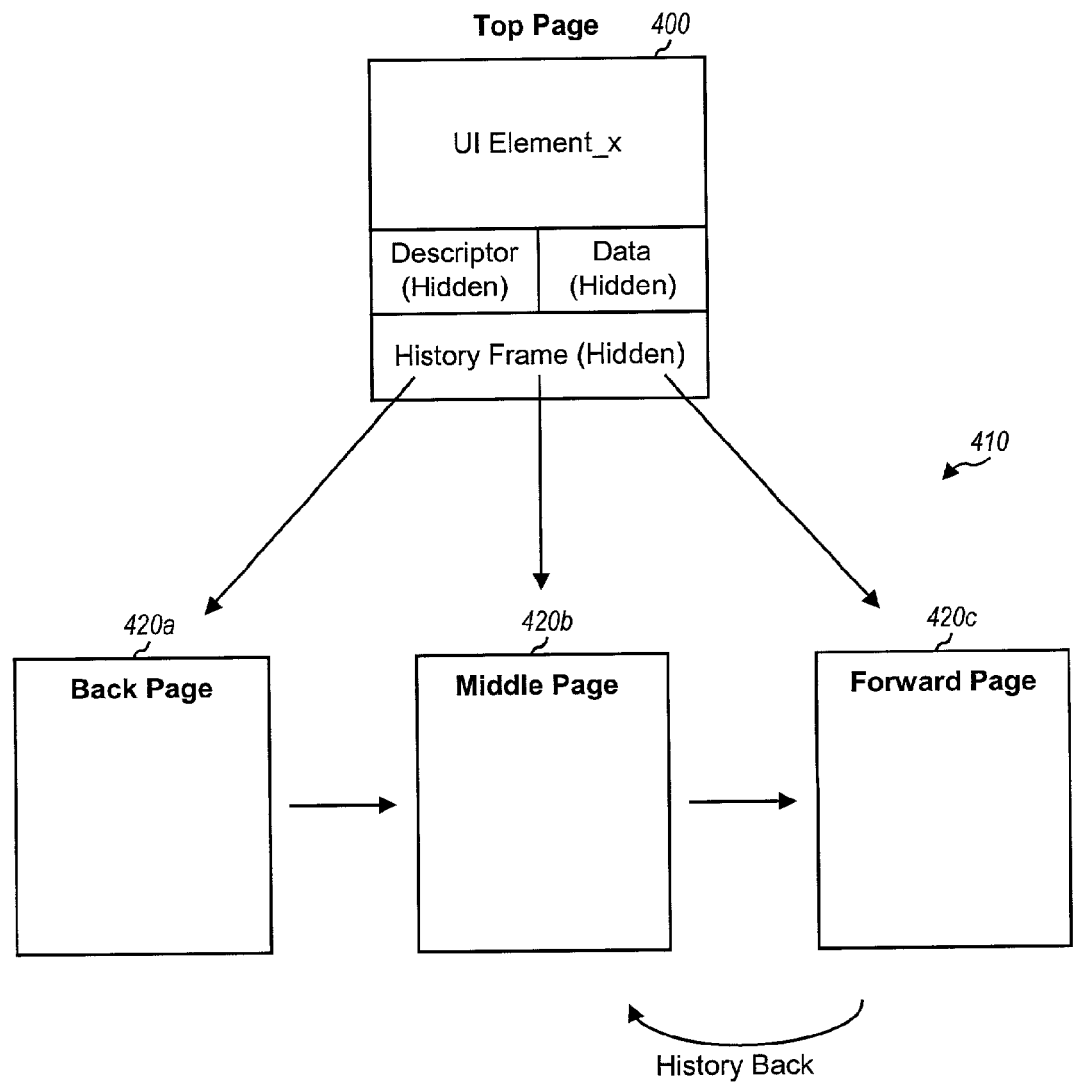
FIG. 4 is a diagram of an embodiment of a set of setup pages used in the first scheme to support user navigation in a browser environment.

FIG. 4 is a diagram of an embodiment of a page set 410 used in the first scheme to support user navigation in a browser environment. Page set 410 may be loaded at the client computer instead of a single conventional HTML page when a top page 400 (e.g., top page 220a in FIG. 2) is loaded for the first time. Top page 400 includes a hidden history frame that includes one or more scripts, data, and so on, used to achieve a set of defined actions for certain supported user action(s) associated with the page, as described below.

As shown in FIG. 4, the scripts in the hidden history frame of top page 400 cause a Back page 420a to be loaded first, then a Middle page 420b to be loaded next, then a Forward page 420c to be loaded last. Correspondingly, the URLs for the three setup pages 420a through 420c are included in the history stack maintained by the browser. The scripts in the hidden history frame then programmatically cause a History Back action to return from the Forward page to the Middle page. Once page set 410 has been loaded, the browser stack pointer points to Middle page 420b, and one page is maintained in front and another page is maintained in back of the current Middle page.

In an embodiment, the setup pages only contain scripts and do not show anything visibly. Even as the setup pages are loaded, the visible UI element in top page 400 does not change.

Back page 420a is used to ensure proper behavior for the Back button click, and may be omitted from page set 410 if it is not desired or necessary to ensure proper behavior for the Backward button click. Similarly, Forward page 420c is used to ensure proper behavior for the Forward button click, and may be omitted from page set 410 if it is not desired or necessary to ensure proper behavior for the Forward button click.

Thereafter, if the Back button of the browser is hit while the history pointer is at Middle page 420b, then the browser transitions to Back page 420a and executes a first script included in the top page's hidden history frame of the Back page to achieve a set of defined actions for the Back button. These actions may be designed to ensure that the proper behavior is obtained for the Back button action (as applied to the previously loaded page, if any). For example, the first script can ensure that the frames for the page are loaded in the proper order to achieve the desired results. Similarly, if the Forward button of the browser is hit while the history pointer is at Middle page 420b, then the browser transitions to Forward page 420c and executes a third script also included in the top page's hidden history frame of the Forward page to achieve a set of defined actions for the Forward button. These actions may be similarly designed to ensure that the proper behavior is obtained for the Forward button action. Upon completion of the desired actions for the Back or Forward page, the executed script then resets the history pointer back to the Middle page, e.g., by executing a History Forward or a History Back command supported by the browser or by repeating the steps used to set up the setup pages. The loading of page set 410 and the transitions between the setup pages are described in further detail below.

The setup pages may be implemented in various manners. In one embodiment, the Back, Middle, and Forward pages are kept in the hidden history frame of the top page, and each of these setup pages is only associated with the script to simulate the proper actions. The visible frames (if any) on the screen are derived from the UI elements in the top page, and these frames not replaced when either the Back or Forward page is loaded. The scripts in the top page's hidden history frames are used to properly load the setup pages, and the scripts for the setup pages are used to perform the defined actions for the Back and Forward button clicks, respectively. In another embodiment, the Back and Forward pages may each include one or more frames having pertinent information that may be displayed or provided in response to the Back and Forward button clicks. These frames of the Back and Forward pages may be either retained or replaced by the frames of the top page when it is reloaded. To ensure proper behavior, the pages in frames other than the hidden history frame should be loaded without generating browser history (e.g., by using a call to "window.location. replace( )").

In an embodiment, the script for each setup page executes whenever that setup page is loaded or invoked (e.g., by a user action). Each script performs the necessary actions to effectuate the loading of the setup pages, and further performs the desired actions for the appropriate user action(s). When the setup pages are loaded for the first time, the script for each page performs a respective set of initialization actions to properly set up the pages. Thereafter, once the setup pages have been loaded, the script for each setup page performs the desired action when the page is invoked. The scripts for the setup pages may maintain a data structure to store data and various state variables needed to effectuate the necessary and/or desired actions.

Figure 5:
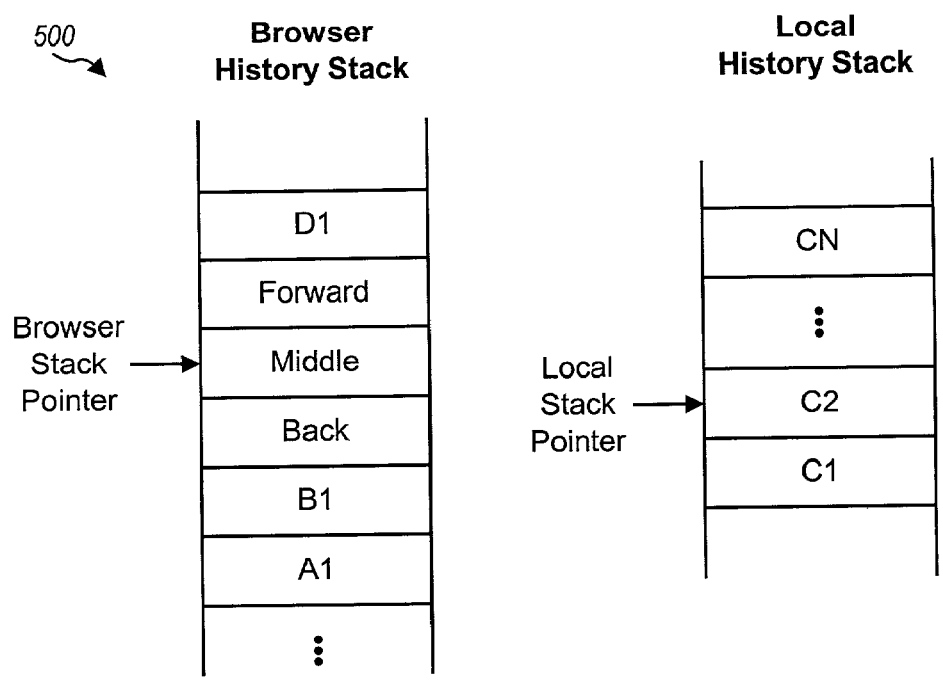
FIG. 5 is a diagram illustrating an embodiment of a stack structure that may be maintained for the loaded pages, in accordance with the first scheme.

FIG. 5 is a diagram illustrating an embodiment of a stack structure 500 that may be maintained for the loaded pages, in accordance with the first scheme. In this embodiment, stack structure 500 includes a history stack maintained by the browser and a local history stack maintained by the scripts in the hidden history frame of the top page. Each history stack includes a number of elements for the URLs of previously loaded pages (e.g., retrieved from the server). The history stacks are used to access and display the proper pages in response to user actions (e.g., Back and Forward button clicks).

For the example shown in FIG. 5, the contents of the browser and local history stacks reflect accesses of page sets 210a through 210d shown in FIG. 2, and then a return to the second page 220b in page set 210c. Specifically, the user sequentially accesses page A1, then page B1, then pages C1 through CN, and then page D1, and thereafter moved back to page C2 of page set 210c. The URLs for these pages are stored in that order in the history stacks, with the URL for the oldest retrieved page being at the bottom of each history stack.

In the example shown in FIG. 5, the browser history stack stores the URLs of pages A1, B1, and D1 in page set 210a, 210b, and 210d in the normal manner. For page set 210c, the browser history stack stores the URLs for the three setup pages for the first page retrieved for page set 210c, which is top page 220a. For each subsequent page 220 retrieved for page set 210c, no additional URL is added to the browser history stack for the retrieved page.

In the embodiment shown in FIG. 5, the local history stack stores only the URLs of the retrieved pages 220 for page set 210c. For each page retrieved for page set 210c, the URL of the retrieved page is added to the local history stack. In another embodiment, the information needed to perform the correct action is stored. In some cases, this might be to load one or more stored URLs. In other cases, it might be to perform other actions. In FIG. 5, C1–CN represent sets of pages being loaded in this example (e.g., a page of UI elements and a data page).

The browser also maintains a browser stack pointer that points to the specific URL in the browser history stack for the page currently being displayed. However, if the current page is one for page set 210c, then the browser stack pointer points to the URL for the Middle page. Similarly, the scripts maintains a local stack pointer that points to the specific URL or action in the local history stack for the page currently being displayed (if at all). At any given instance in time, the browser stack pointer and the local stack pointer each points to the current displayed page.

Figure 6:
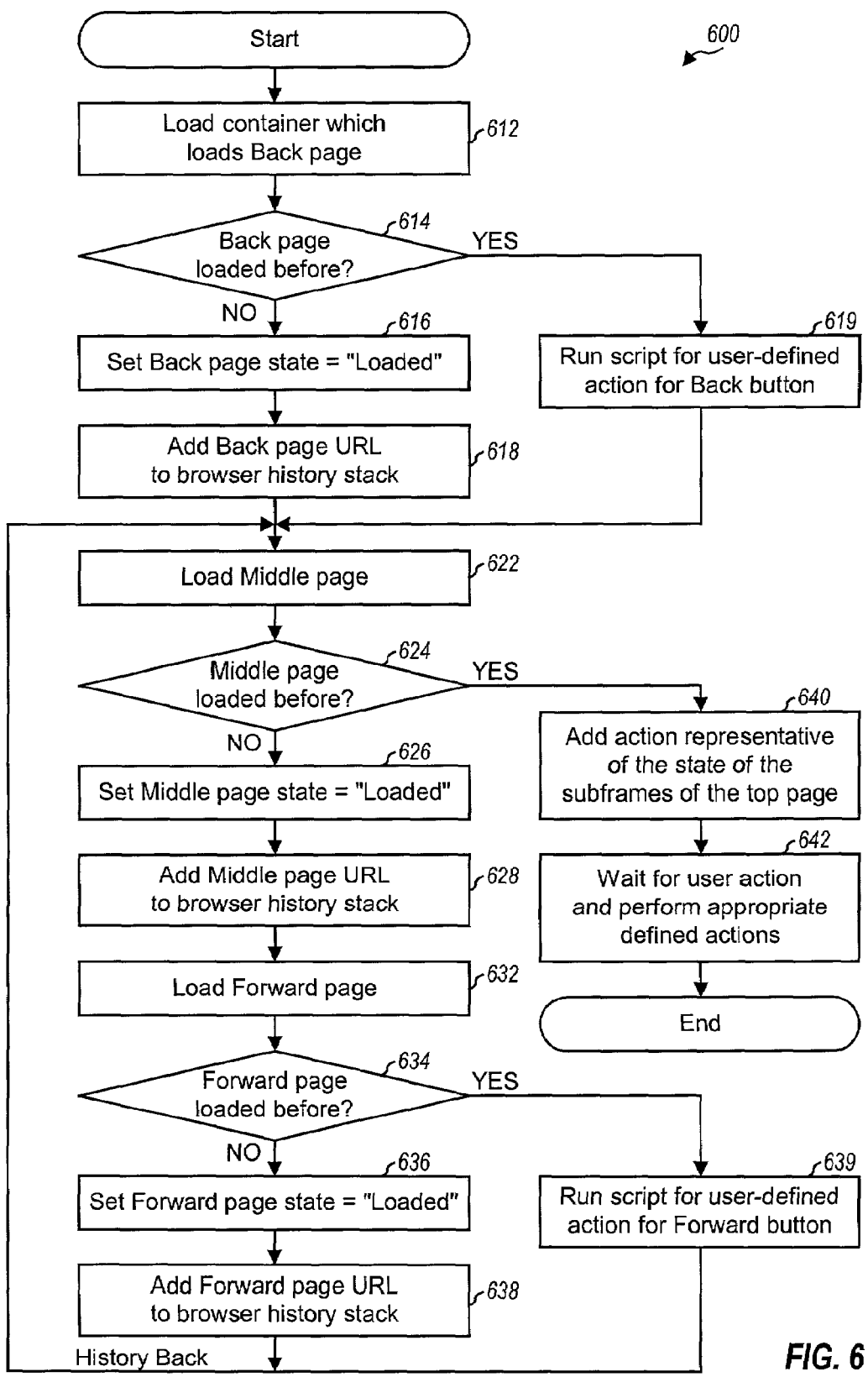
FIG. 6 is a flow diagram of an embodiment of a process to load a set of setup pages for a top page, based on the first scheme.

FIG. 6 is a flow diagram of an embodiment of a process 600 to load a set of setup pages for a top page, based on the first scheme. Initially, the container for the page set is loaded, and a script in the top page's hidden history frame loads the Back page, at step 612. This may be achieved by executing a "window.location='back.htm'" command in the hidden history frame, which loads the file 'back.htm' for the Back page. Once the Back page has been loaded, a first script in the hidden history frame for the Back page is executed to perform a first set of initialization actions. These actions may include determining whether or not the Back page has been loaded previously, at step 614. This determination may be made by checking a first state variable maintained for the Back page. If the Back page has not been loaded before, indicating that the setup pages are loaded for the first time, then the Back page state is set to "Loaded", at step 616. The URL for the Back page is also added to the browser history stack, at step 618. This may be achieved by executing the "window.location='back.htm'" command, as described above. Otherwise, if it is determined in step 614 that the Back page has been loaded previously, then steps 616 and 618 may be skipped. In either case, the process proceeds to step 622.

The first script in the hidden history frame for the Back page then loads the Middle page, at step 622. This may be achieved by executing a "window.location= 'middle.htm'" command in the history hidden history frame, which loads the file 'middle.htm' for the Middle page. Once the Middle page has been loaded, a second script for the Middle page is executed to perform a second set of initialization actions. These actions may include determining whether or not the Middle page has been loaded previously, at step 624. This determination may be made by checking a second state variable maintained for the Middle page. If the Middle page has not been loaded before, then the Middle page state is set to "Loaded", at step 626. The URL for the Middle page is also added to the browser history stack (by executing the "window.location= 'middle.htm'" command), at step 628. The process then proceeds to step 632.

The second script in the hidden history frame for the Middle page then loads the Forward page, at step 632. This may be achieved by invoking a "window.location='forward.htm'" command, which loads the file 'forward.htm' for the Forward page. Once the Forward page has been loaded, a third script in the hidden history frame for the Forward page is executed to perform a third set of initialization actions. These actions may include determining whether or not the Forward page has been loaded previously, at step 634. This determination may be made by checking a third state variable maintained for the Forward page. If the Forward page has not been loaded before, then the Forward page state is set to "Loaded", at step 636. The URL for the Forward page is also added to the browser history stack (by executing the "window.location='forward.htm'" command), at step 638. Otherwise, if it is determined in step 634 that the Forward page has been loaded previously, then steps 636 and 638 may be skipped. In either case, the process returns to step 622, and the Middle page is reloaded. This transition may be achieved by performing a History Back action, as supported by the browser.

Back at step 624, if it is determined that the Middle page has been loaded previously, indicating that the setup pages have been loaded, then an action that may represent the state of the subframes of the top page is added to the local history stack, at step 640. The top page is not reloaded during process 600. The process then waits for a user action and performs the appropriate defined actions, at step 642.

The Back, Middle, and Forward page states are used to indicate whether or not the corresponding Back, Middle, and Forward pages have been loaded at the client computer. Initially, these states are set to some particular value (e.g., "NotLoaded"), and the scripts for these setup pages perform the appropriate initialization actions to properly load the setup pages and to possibly perform other set up functions (e.g., update the local history stack with the URL of the top page). The Back, Middle, and Forward page states may be set to "Loaded" once the corresponding setup pages have been successfully loaded. Thereafter, if the Back or Forward page is reloaded due to a Back or Forward button click, then the appropriate set of defined actions is performed by the script for the activated page.

Figure 7:
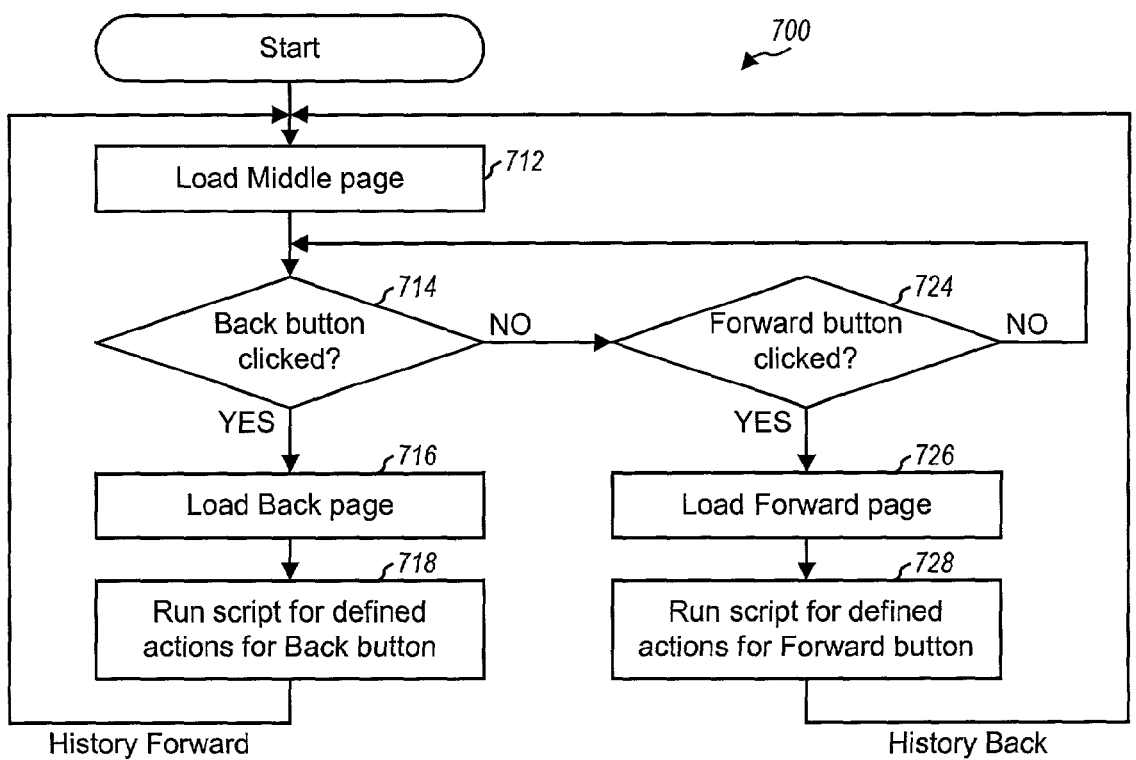
FIG. 7 is a flow diagram of an embodiment of a process to perform the defined actions to support user navigation in a browser environment, based on the first scheme.

FIG. 7 is a flow diagram of an embodiment of a process 700 to perform the defined actions to support user navigation in a browser environment, based on the first scheme. Initially, the setup pages (e.g., the Back, Middle, and Forward pages) are loaded, the state variables are initialized, and the browser and local history stacks are updated with the appropriate URLs, as described above in FIG. 5. The Middle page is then loaded as the current page, at step 712. While the browser stack pointer is at the Middle page, certain user actions are captured, and the appropriate defined actions are subsequently performed for these captured user actions.

While in the Middle page, a determination is made whether or not the Back button has been hit, at step 714. If the answer is yes, then the Back page is loaded by the browser based on the Back URL in the browser history stack, at step 716. Once the Back page has been loaded, the script in the hidden history frame for the Back page is executed, which then performs the defined actions for the Back button, at step 718. The process then returns to step 712 (e.g., by performing a History Forward action) and the Middle page is loaded again.

Back at step 714, if the Back button was not hit, then a determination is made whether or not the Forward button has been hit, at step 724. If the answer is yes, then the Forward page is loaded by the browser based on the Forward URL in the browser history stack, at step 726. Once the Forward page has been loaded, the script in the hidden history frame for the Forward page is executed, which then performs the defined actions for the Forward button, at step 728. The process then returns to step 712 (e.g., by performing a History Back action), and the Middle page is loaded again.

Back at step 724, if the Forward button was not hit, then the process returns to step 714 and waits for a user action.

For clarity, an example is now described based on the browser and local history stacks shown in FIG. 5. For this example, the current displayed page is page C2, which represents a page of UI elements and a data page. The browser stack pointer points to the URL for the Middle page, and the local stack pointer points to the URL for page C2. If the Back button is hit, then the browser stack pointer moves back to the Back URL, and the browser loads the Back page. The script in the hidden history frame for the Back page then executes. The script moves the local stack pointer back to the URL for page C1, causes page C1 to be loaded, and then performs a History Forward action to reload the Middle page. The browser stack point is thus moved back to the URL for the Middle page, and the local stack pointer is moved to the URL for page C1.

If the Back button is hit once more, then the browser stack pointer again moves back to the Back URL, and the browser loads the Back page. The script for the Back page then executes and moves the local stack pointer to the stack boundary. The script then realizes that no more pages are available in the backward direction, and performs a History Back action to exit the dependent pages and to reload page B1. The browser stack point is thus moved to the URL for page B1. In an embodiment, the local stack is destroyed when the top page is unloaded.

If the Forward button is hit at this point, then the browser stack pointer moves forward to the Back URL, and the browser loads the Back page. The script for the Back page then executes and moves the local stack pointer to the URL for page C1 (assuming that page B1 maintains some state, e.g., that page B1 has the same top page as page C1). And if the previous assumption cannot be made, then when the user navigates outside the bounds of the local stack to a previous or forward page, a reload from the top may be performed upon returning to page C1. The script then causes page C1 to be loaded and then performs a History Forward action to reload the Middle page. The browser stack pointer is thus moved to the URL for the Middle page, and the local stack pointer is moved to the URL for page C1.

The complementary action is performed when the user move forward in the stack. If the Forward button is hit, then the browser stack pointer moves forward to the URL for the Forward page, and the browser loads the Forward page. The script for the Forward page then executes, moves the local stack pointer to the proper URL, causes the associated page to be properly loaded, and then performs a History Back action to reload the Middle page. The browser stack pointer is thus moved to the URL for the Middle page, and the local stack pointer is moved to the URL for proper page.

In general, the script for each setup page may be designed to perform any set of defined actions desired for the user action(s) supported by the setup page. In one specific embodiment, the set of defined actions for each of the Back and Forward pages may include (1) loading the UI elements, (2) loading the data, (3) refreshing the UI elements, and (4) returning or resetting the browser stack pointer to the Middle page (e.g., by performing a History Forward action from the Back page or a History Back action from the Forward page). Steps (1) through (3) effectively reload a desired (and previously loaded) page to obtain the proper behavior. This embodiment may be used to reload dependent pages having interdependent frames.

In other embodiments, the script may be designed to perform other functions. For example, the set of defined actions performed by the script may include displaying warnings that no history is kept (i.e., history unavailable). The script may be designed to perform any action. For example, user-inputs (e.g., text entries) and user-actions (e.g., mouse clicks, mouse movements, keystrokes, and so on) may be maintained and used to perform certain actions or to undo prior user actions.

Second Scheme

For the second scheme, each dependent page may be implemented with page 300 shown in FIG. 3 having a hidden history frame that includes one or more scripts. For the second scheme, a page of script (also referred to as a "placeholder" page) associated with each dependent page is stored. The placeholder pages are placeholders for conceptual history items. Conceptually, each of these placeholders corresponds to a history item (i.e., an action to be performed when the history buttons are clicked), but they do not necessarily directly map to a single URL. The script for each placeholder page also maintains the necessary state variables to ensure that the defined actions are performed for an associated dependent page to achieve the proper behavior.

Figure 8:
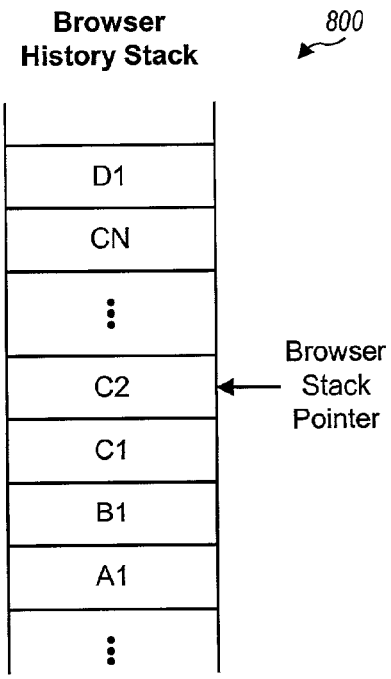
FIG. 8 is a diagram illustrating an embodiment of a stack structure that may be maintained for the loaded pages, in accordance with the second scheme.

FIG. 8 is a diagram illustrating an embodiment of a stack structure 800 that may be maintained for the loaded pages, in accordance with the second scheme. In this embodiment, stack structure 800 includes just the history stack maintained by the browser. The browser history stack stores the URL of a placeholder page for each page in page sets 210a, 210b, 210c, and 210d. At any given instance in time, the browser stack pointer points to the current displayed page.

Figure 9:
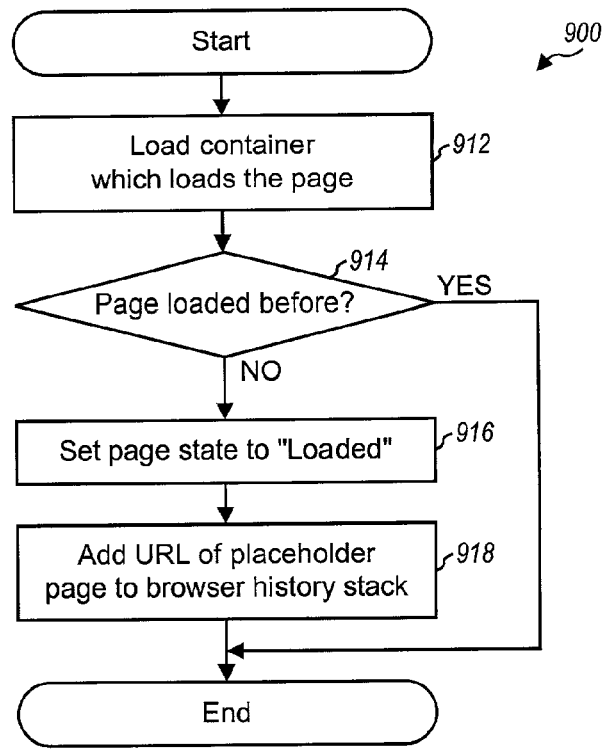
FIG. 9 is a flow diagram of an embodiment of a process to load a particular dependent page, based on the second scheme.

FIG. 9 is a flow diagram of an embodiment of a process 900 to load a particular dependent page, based on the second scheme. Initially, the container for the dependent page is loaded, which then loads the dependent page with its hidden history frame, at step 912. This may be achieved by executing a "window.location='pagex.htm'" command, which loads the file 'pagex.htm' for the dependent page. Once the dependent page has been loaded, a script in the page's hidden history frame is executed to perform a set of initialization actions. These actions may include determining whether or not the dependent page has been loaded previously, at step 914. This determination may be made by checking a state variable maintained for the dependent page. If the dependent page has not been loaded before, then the dependent page state is set to "Loaded", at step 916.

The URL for the placeholder page is added to the browser history stack, at step 918. This may be performed automatically by the browser by the "window.location='pagex.htm'" command. If a local history stack is also maintained for dependent pages, then the action associated with this dependent page is also placed in the local history stack. Otherwise, if it is determined in step 914 that the dependent page has been loaded previously, then steps 916 and 918 may be skipped. In either case, the process then terminates.

When an action takes place that should generate a new history item, a new placeholder page is produced and added to the browser history stack.

Figure 10:
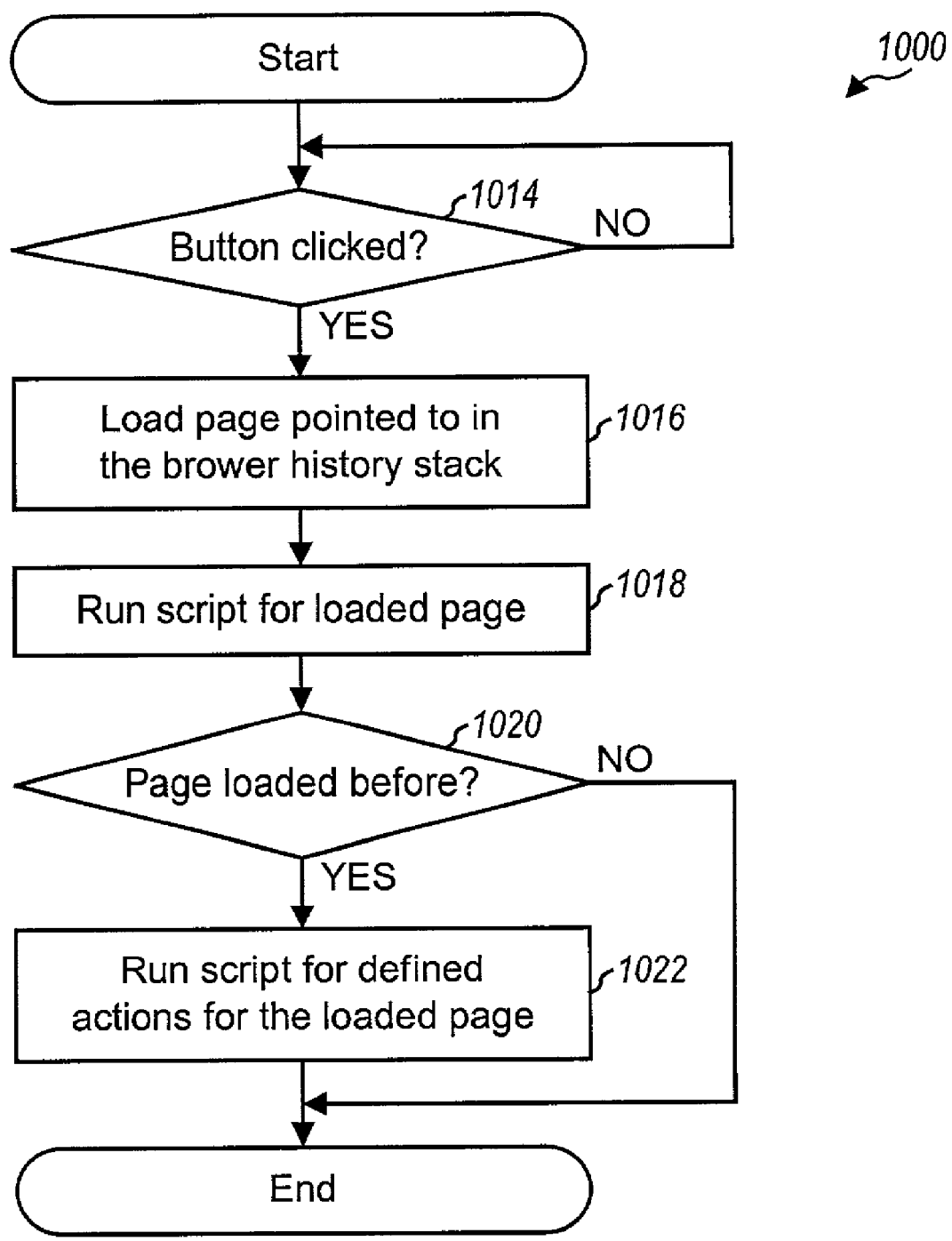
FIG. 10 is a flow diagram of an embodiment of a process to perform the defined actions to support user navigation in a browser environment, based on the second scheme.

FIG. 10 is a flow diagram of an embodiment of a process 1000 to perform the defined actions to support user navigation in a browser environment, based on the second scheme. Initially, a determination is made whether or not a Back or Forward button has been hit, at step 1014. If the answer is no, then the process returns to step 1014 and waits. Otherwise, if the answer is yes, then the browser stack pointer is advanced by the browser (either backward or forward depending on whether the Back for Forward button was hit), and the dependent page for the URL pointed to by the pointer is then loaded, at step 1016.

Once the dependent page has been loaded, the script in the page's hidden history frame is executed, which then performs the defined actions for the dependent page, at step 1018. The script initially determines whether or not the dependent page has been loaded previously, at step 1020. This may be achieved by checking whether or not the page state has been set to "Loaded". If the dependent page has been loaded previously, then the script performs the defined actions for the dependent page, at step 1022.

The dependent pages may be provided to the client computer in various manners. In a first embodiment, the pages are downloaded to the client computer when requested (e.g., sent from the server upon receiving the URL for the top page). In a second embodiment, some portions of the pages are generated locally by the client computer and the remaining portions of the pages may be downloaded from the server. For example, the hidden history frames may be generated locally and only the pages for frames that include pertinent information may be downloaded from the server. In a third embodiment, the pages may be dynamically generated (e.g., as active server pages (ASPs)) by the server as they are needed or requested by the client computer. In a fourth embodiment, the pages are generated as a single HTML page and by using a URL with a query string that contains the pertinent data. The browser then interprets the data in the query string and performs the appropriate actions directed by the data. In a fifth embodiment, the pages are dynamically generated on the client side (e.g., by using document write). Other ways to generate the pages may also be implemented, and this is within the scope of the invention. In each case, the scripts on the page should be provided with enough state information to know which action to perform when the scripts run.

Comparison Between the First and Second Schemes

The first and second schemes utilize different implementations to properly load the dependent pages or groups of pages. For the first scheme, the scripts for the setup pages may be designed to perform the defined actions for the Back and Forward buttons. This may make it simpler to generate the setup pages. And for the second scheme, each placeholder page includes a respective script that performs the defined actions for the page when the page is loaded or reloaded. This can allow for customization of the defined actions to be performed for each dependent page.

For the first scheme, the browser history stack includes the URL for the three setup pages regardless of the number of dependent pages loaded. The URLs for all dependent pages are added to the local history stack, which is maintained by the scripts and not accessible to the browser. A conventional browser typically allows a user to jump to any URL stored in the browser history stack. However, since only the Back, Middle, and Forward URLs are included in the browser history stack for the dependent pages, the user is only able to navigate back and forth one page at a time.

For the second scheme, the URLs for the dependent pages are maintained in the browser history stack. Thus, the user is able to jump to any dependent page (and skip intermediate pages) by selecting the proper URL in the stack. Moreover, for this scheme, the browser can generate and display the proper title for the URL corresponding to the selected dependent page by setting the title of the page in the hidden history frame.

Computer System

Figure 11:
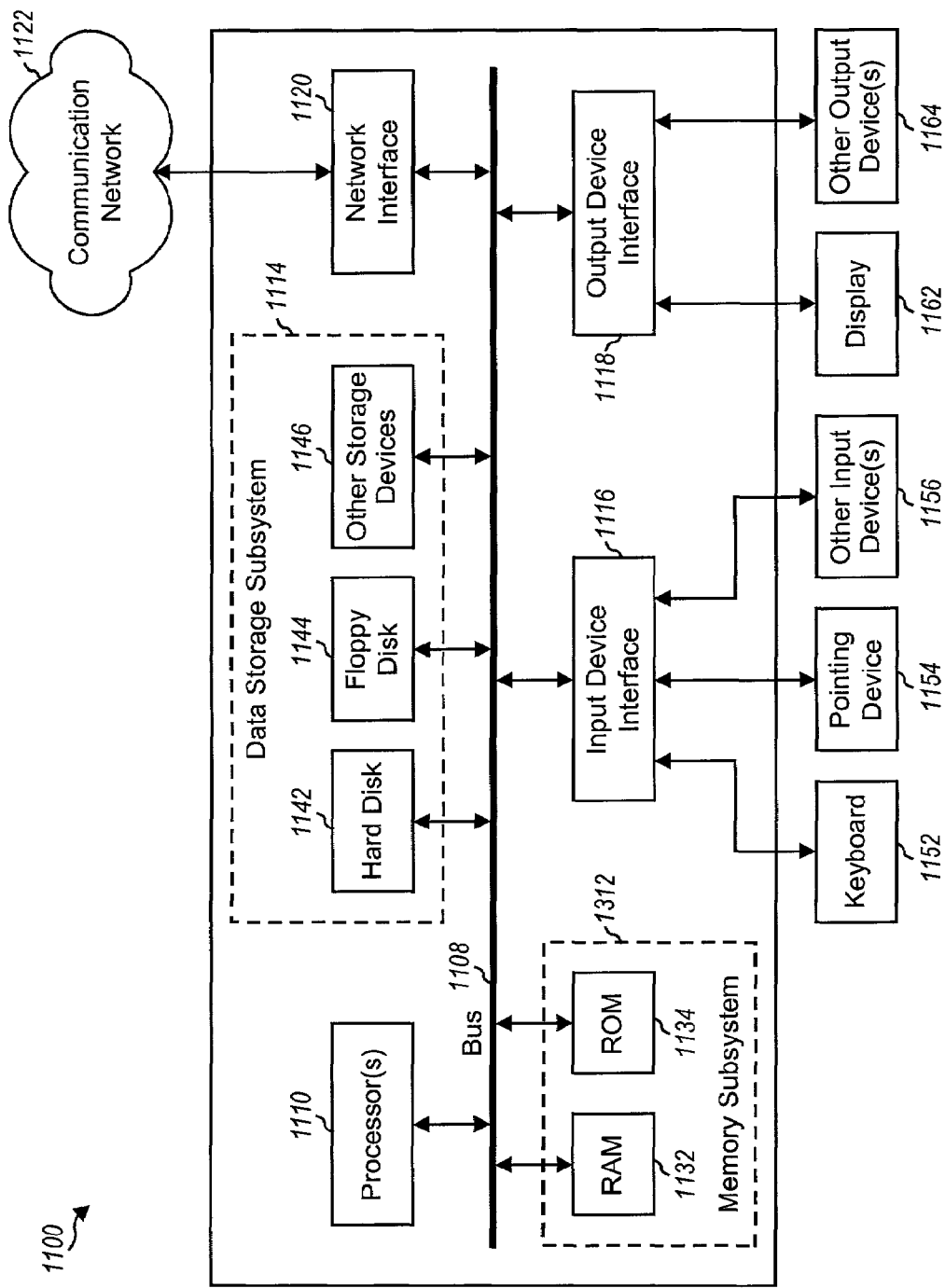
FIG. 11 is a block diagram of a computer system.

FIG. 11 is a block diagram of an embodiment of a computer system 1100 that may be used to implement client computer 110 or server 130 in FIG. 1. System 1100 includes a bus 1108 that interconnects major subsystems such as one or more processors 1110, a memory subsystem 1112, a data storage subsystem 1114, an input device interface 1116, an output device interface 1118, and a network interface 1120. Processor(s) 1110 perform many of the processing functions for system 1100 and communicate with a number of peripheral devices via bus 1108.

Memory subsystem 1112 may include a RAM 1132 and a ROM 1134 used to store codes and data that implement various aspects of the invention. In a distributed environment, the program codes and data may be stored on a number of computer systems and used by the processors of these systems. Data storage subsystem 1114 provides non-volatile storage for program codes and data, and may include a hard disk drive 1142, a floppy disk drive 1144, and other storage devices 1146 such as a CD-ROM drive, an optical drive, and removable media drive.

Input device interface 1116 provides interface with various input devices such as a keyboard 1152, a pointing device 1154 (e.g., a mouse, a trackball, a touch pad, a graphics tablet, a scanner, or a touch screen), and other input device(s) 1156. Output device interface 1118 provides an interface with various output devices such as a display 1162

(e.g., a CRT or an LCD) and other output device(s) 1164. Network interface 1120 provides an interface for system 1100 to communicate with other computers coupled to communication network 1122.

Many other devices or subsystems (not shown) may also be coupled to system 1100. In addition, it is not necessary for all of the devices shown in FIG. 11 to be present to practice the invention. Furthermore, the devices and subsystems may be interconnected in configurations different from that shown in FIG. 11. One or more of the storage devices may be located at remote locations and coupled to system 1100 via communication network 1122. The operation of a computer system such as that shown in FIG. 11 is readily known in the art and not described in detail herein. The source codes and data to implement various aspects and embodiments of the invention (e.g., the scripts for the dependent pages and/or setup pages, the state variables, and the data for the dependent pages) may be operatively disposed in memory subsystem 1112 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer program product for loading pages via a browser, comprising a computer-usable medium having embodied therein computer-readable program codes for
    loading a first setup page having associated therewith a first script to be executed in response to a first user action, wherein the first script is executed to achieve a set of defined actions for a current dependent page, and wherein the set of defined actions is associated with loading or refreshing the current dependent page at the browser; and
    loading a second setup page, and
    wherein the first script is executed in response to the first user action to transition from the second setup page to the first setup page.

2. The computer program product of claim 1, wherein the first user action is a click on a Back button of the browser.

3. The computer program product of claim 1, wherein the first and second setup pages are loaded in response to an access of a top page.

4. The computer program product of claim 3, wherein the top page is a first retrieved dependent page in a set of one or more dependent pages.

5. The computer program product of claim 1, wherein URLs for the first and second setup pages are stored in a history stack maintained by the browser.

6. The computer program product of claim 1, wherein the computer-usable medium is further embodied with computer-readable program codes for loading a third setup page having associated therewith a third script to be executed in response to a second user action to transition from the second setup page to the third setup page.

7. The computer program product of claim 6, wherein the second user action is a click on a Forward button of the browser.

8. The computer program product of claim 1, wherein the second setup page is further associated with a second script, and wherein the first and second scripts are executed to facilitate the loading of the first and second setup pages.

9. The computer program product of claim 1, wherein the scripts for the first and second pages maintains a local stack for retrieved dependent pages.

10. The computer program product of claim 1, wherein the set of defined actions controls the order that frames of the current dependent page are loaded.

11. The computer program product of claim 1, wherein the set of defined actions includes
    loading user interface (UI) elements for the page,
    loading data for the page, and
    refreshing the UI elements.

12. A computer program product for loading pages via a browser, comprising a computer-usable medium having embodied therein computer-readable program codes for
    loading a first setup page having associated therewith a first script to be executed in response to a first user action, wherein the first script is executed to achieve a set of defined actions for a current dependent page, and wherein the set of defined actions is associated with loading or refreshing the current dependent page at the browser; and
    loading a second setup page, and
    wherein the first and second setup pages are loaded in response to an access of a top page, wherein URLs for the first and second setup pages are stored in a history stack maintained by the browser, and wherein the first script is executed in response to a click on a Back button of the browser if the second setup page is a current page in the history stack.

13. A method for loading pages via a browser, comprising:
    loading a first setup page having associated therewith a first script to be executed in response to a first user action, wherein the first script is executed to achieve a set of defined actions for a current dependent page, and wherein the set of defined actions is associated with loading or refreshing the current dependent page at the browser; and
    loading a second setup page, and
    wherein the first script is executed in response to the first user action to transition from the second setup page to the first setup page.

14. A computer program product for loading pages via a browser, comprising a computer-usable medium having embodied therein computer-readable program codes for
    loading a page having associated therewith a script executed when the page is loaded to initialize a set of one or more state variables maintained for the page, wherein the script is further executed in response to a subsequent access of the page to achieve a set of defined actions for the page, and wherein the set of defined actions is associated with loading or refreshing the page at the browser.

15. The computer program product of claim 14, wherein the script for the page is executed in response to a click on a Back button or a Forward button of the browser.

16. The computer program product of claim 14, wherein the set of defined actions includes
    loading user interface (UI) elements for the page,
    loading data for the page, and
    refreshing the UI elements.

17. The computer program product of claim 14, wherein a URL for the page is added to a history stack maintained by the browser.

18. A method for loading pages via a browser, comprising: loading a page having associated therewith a script executed when the page is loaded to initialize a set of one or more state variables maintained for the page, wherein the script is further executed in response a subsequent access of the page to achieve a set of defined actions for the page, and wherein the set of defined actions is associated with loading or refreshing the page at the browser.

19. A page set to facilitate user interaction in a browser environment, comprising:
a first setup page having associated therewith a first script to be executed in response to a first user action; and
a second setup page having associated therewith a second script, and
wherein the first script is executed in response to the first user action to transition from the second setup page to the first setup page, and wherein the first script is executed to achieve a set of defined actions for a current dependent page, and wherein the set of defined actions is associated with loading or refreshing the current dependent page at the browser.

20. The page set of claim 19, further comprising:
a third setup page having associated therewith a third script to be executed in response to a second user action to transition from the second setup page to the third setup page.

* * * * *